United States Patent [19]

Kapadia et al.

[11] Patent Number: 5,768,314
[45] Date of Patent: Jun. 16, 1998

[54] COMMUNICATIONS SYSTEM

[75] Inventors: Mayank Kapadia, Swindon; Paul Voskar, Harrow, both of United Kingdom

[73] Assignee: Motorola, Inc., Schaumburg, Ill.

[21] Appl. No.: 489,203

[22] Filed: Jun. 9, 1995

[30] Foreign Application Priority Data

Jun. 9, 1994 [GB] United Kingdom ............ 9411611

[51] Int. Cl.[6] .................... H04L 25/36; H04B 14/00
[52] U.S. Cl. ................ 375/242; 375/259; 371/5.5
[58] Field of Search ............... 375/240–242, 375/259, 377; 371/5.5; 395/2.3; 455/33.1; 320/538–545

[56] References Cited

U.S. PATENT DOCUMENTS

| | | | |
|---|---|---|---|
| 5,119,397 | 6/1992 | Dahlin et al. | 375/216 |
| 5,327,576 | 7/1994 | Uddenfeldt et al. | 370/333 |
| 5,402,447 | 3/1995 | Roney, IV | 375/340 |
| 5,432,778 | 7/1995 | Minde et al. | 375/343 X |
| 5,491,719 | 2/1996 | Sellin et al. | 375/213 |
| 5,557,639 | 9/1996 | Heikkila et al. | 375/224 |

Primary Examiner—Young T. Tse

[57] ABSTRACT

An apparatus and method are described providing a combination full/half rate service type comprising a half rate speech codec and a full rate channel codec having a front end arranged for communication with the half rate speech codec wherein the front end includes a bit mapping re-ordering module.

8 Claims, 5 Drawing Sheets

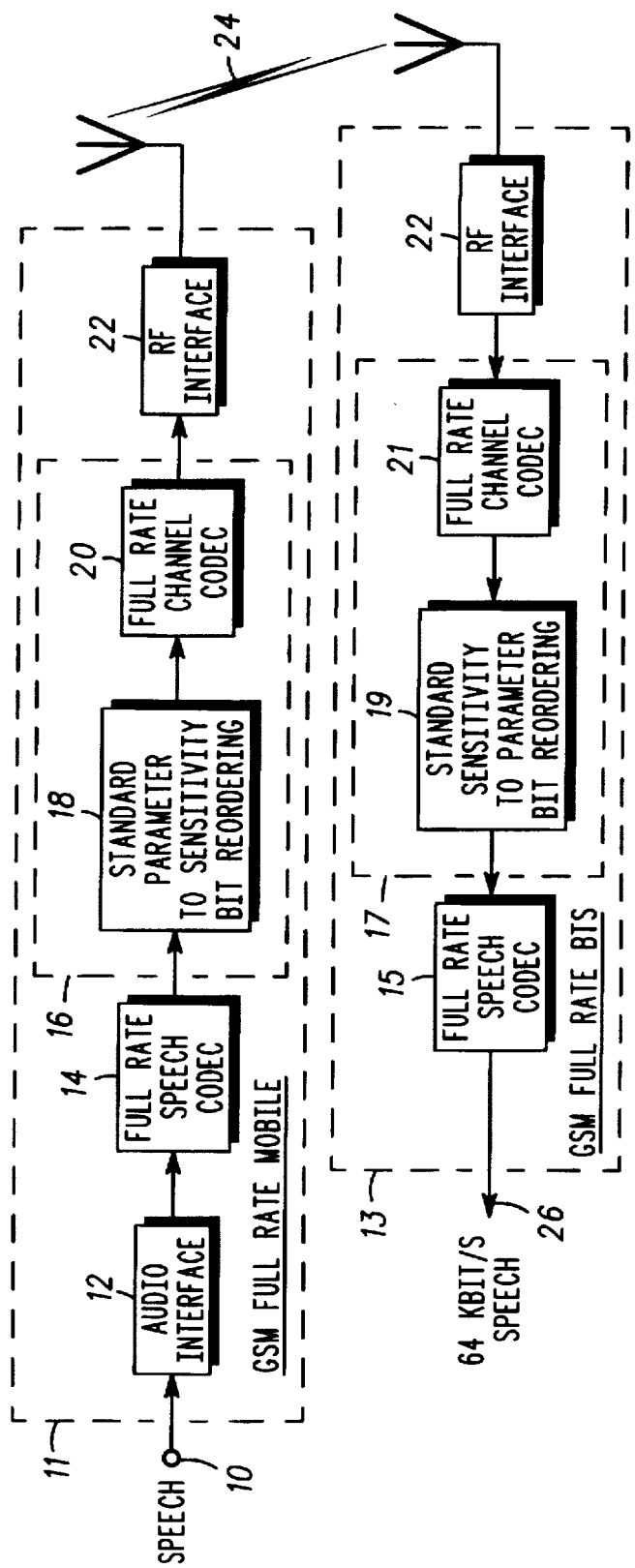

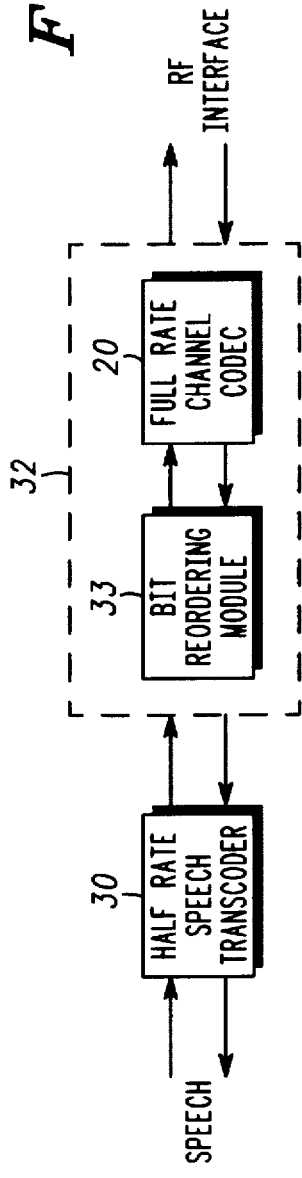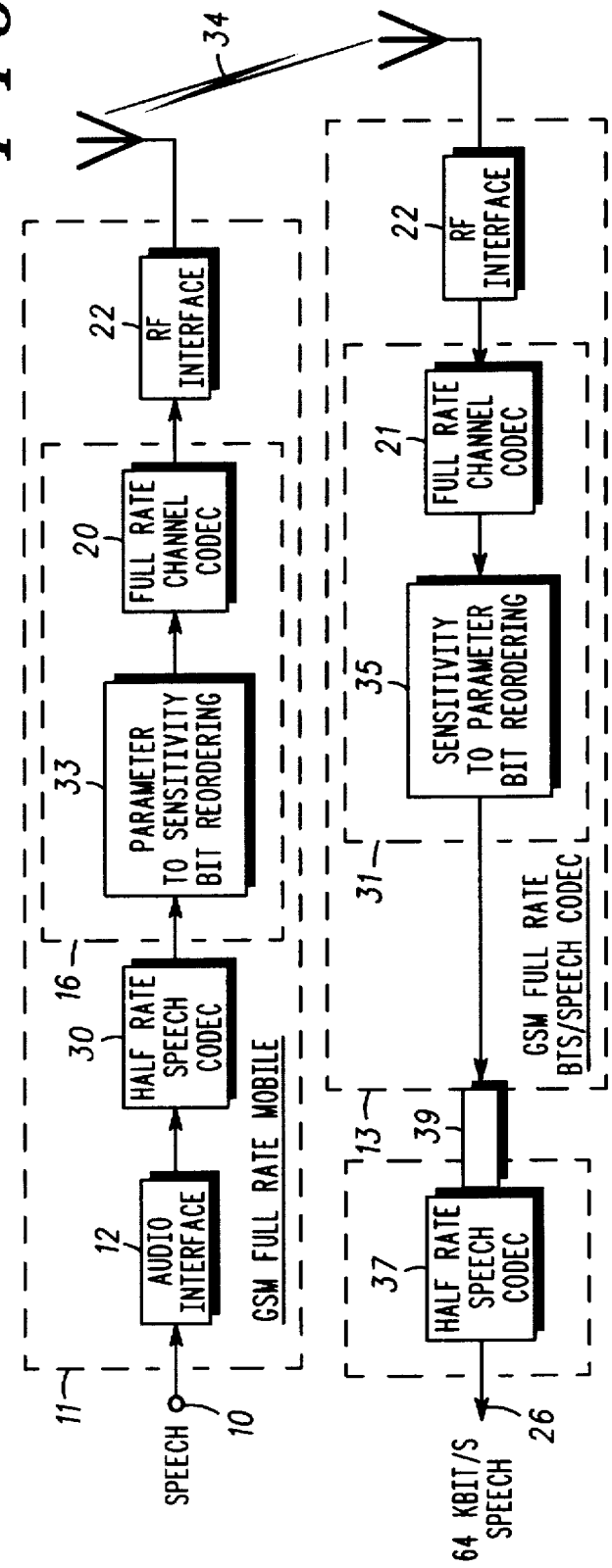

COMMUNICATIONS SYSTEM

FIELD OF THE INVENTION

This invention relates in general to communications systems, and more particularly to a method and an apparatus for providing a combination full/half rate service type in a communications system.

BACKGROUND TO THE INVENTION

In digital communications systems there are components that encode and decode speech for communications over radio frequencies. In GSM (Global System for Mobile Communications) a speech transcoder provides the encoding and decoding ability in one component and is sometimes referred to as a speech codec. The GSM speech transcoder is defined by GSM Recommendation 06.10 to be 16 bit exact. Similarly, there is a channel codec for encoding and decoding additional information and data to the speech for transmitting and receiving over the air.

In the current GSM Digital Cellular Radio System, the speech codec delivers 13 kbits of compressed speech to the channel codec, which in turn delivers 22.8 kbits to the radio frequency (RF) path. This is call a full rate service type. Being planned is half rate speech service, where a half rate speech codec will deliver about 6 kbits to a half rate channel codec, which in turn will deliver 11.4 kbits to the RF path.

In addition to compressed speech data, a speech/channel codec interface also uses an extra 3 kbits to convey control information. This control information includes the Bad Frame (BFI) flag which tells the speech decoder whether or not the current compressed speech frame received from the channel decoder is erroneous or not. The flag is used by the Discontinuous Transmission (DTX) scheme in the speech decoder to improve the subjective quality of the received speech. Also transmitted in this 3 kbits is the service type for the call. The service types include full rate speech and half rate speech. The service type is conveyed to the channel codec. The channel codec then sends this service information to the speech codec.

The speech codec delivers a frame of compressed speech bits, grouped in terms of the speech parameters that represent the original speech. These parametrically ordered bits are re-ordered by the channel codec into to a sensitivity ordering. A single bit error in any of the most sensitive bits will result in the inability to intelligibly regenerate the original speech. Whereas bit errors in the least sensitive bits result in only slight, if at all subjective degradation of the decoded speech.

The channel codec is usually at the Base Transceiver Site (BTS) site, whereas the speech codec can be at the BTS, Base Station Controller (BSC) or Mobile Switching Centre (MSC) sites. When the speech codec is not at the BTS site, GSM specifies the interface or protocol that must be used between the remote speech codec and the channel codec. Such an interface exists for full rate (GSM 08.60) and is being planned for half rate (either GSM 08.60 or new document).

The algorithms used in the full rate speech codec and the ones currently proposed for the half rate speech codec are completely different. Hence, the parameters they produce and the parametric to sensitivity ordering are also different.

In both full and half rate service, the channel codec has 3 classes of bits: 1a, 1b, and 2 with 1a being the most sensitive and 2 being the least. Different types and amounts of channel coding are then applied to each of these 3 classes.

In full rate there are 50 class 1a bits, 3 Cyclic Redundancy Check (CRC) bits, 132 class 1b bits, 78 class 2 bits and 4 tail bits, which after coding form 456 bits. In half rate, there are 22 class 1a bits, 3 CRC bits, 73 class 1b bits, 17 class 2 bits, 6 tail bits, which after coding form 228 bits.

In both full and half rate the 1a bits have a Cyclic Redundancy Check (CRC) associated with them; the 1a and 1b and CRC are convolutionally coded; and no extra protection is added to the class 2 bits.

In full rate, the primary use of the CRC is to flag a bad frame (the BFI). In half rate, the BFI is set not only by the CRC but also by a Window Error Detection (WED) scheme specified as a part of the Motorola, Inc. half rate algorithm.

The full rate remote speech codec to full rate channel codec interface uses a 16 kbits GSM interface (GSM 08.60). The equivalent half rate interface could go down to 8 kbits and have the advantage of reducing the leasing costs by one half of the serial links between remote speech codec and base site (channel codec). Plans are being developed to formulate both 8 kbits and 16 kbits modes for the half rate remote speech codec to channel codec interface.

FIG. 1 shows an uplink communication in the prior art where a full rate speech service is implemented using a full rate speech coder 14 and full rate channel coder 20. Speech is delivered to an input 10 at an audio interface 12 of a mobile station 11. The speech is coded at the mobile station's full rate speech codec 14. The coded speech is delivered to a channel codec processor 16. The channel codec processor 16 includes the standard predefined parameter to sensitivity re-ordering module 18 as well as a full rate channel codec 20. Output from the full rate speech codec 14 is delivered to the standard parameter to sensitivity bit re-ordering module 18. The output of the standard parameter to sensitivity bit re-ordering module 18 is delivered to the full rate channel codec 20 for further processing then delivered to a radio frequency (RF) interface 22 for transmitting representative signals 24 over the air.

The representative signals 24 are received at a base transceiver station 13 and processed through a RF interface 22 for delivering at a channel codec processor 17 which is similar to the channel codec processor 16 of the mobile station 11.

The signals are delivered to a full rate channel codec 21 for initial decoding and then processed by a sensitivity to parameter bit re-ordering module 19. The output of the sensitivity to parameter bit re-ordering module 19 is then delivered to a full rate speech codec 15 for further decoding and outputting 64 kbit/s speech 26. The full rate speech codec 15 located at the BTS site for clarity. Similarly a half rate service may be implemented using half rate speech and channel codec.

It is desirable to be able to offer a combination full/half rate service whereby the lower cost advantages may be gained from the half rate service yet robustness and quality of the full rate service is gained.

SUMMARY OF THE INVENTION

According to the present invention a communications system is provided having a combination full/half rate service type comprising a half rate speech codec and a full rate channel codec having a front end arranged for communication with the half rate speech codec wherein the front end includes a bit mapping re-ordering module.

According to the present invention a method is described for providing a combination full/half rate service in a communications system having a speech codec and a channel codec including the step of providing a bit mapping re-ordering as a front end for the channel codec for communications with the speech codec.

BRIEF DESCRIPTION OF THE DRAWING

FIG. 1 shows a block diagram of a prior art uplink full rate service communication.

FIG. 2 shows a block diagram of a full/half rate service combination according to the present invention.

FIG. 3 shows a block diagram of an uplink communication including the full/half rate service combination of FIG. 2.

DETAILED DESCRIPTION OF THE PREFERRED EMBODIMENT

Figure 4:
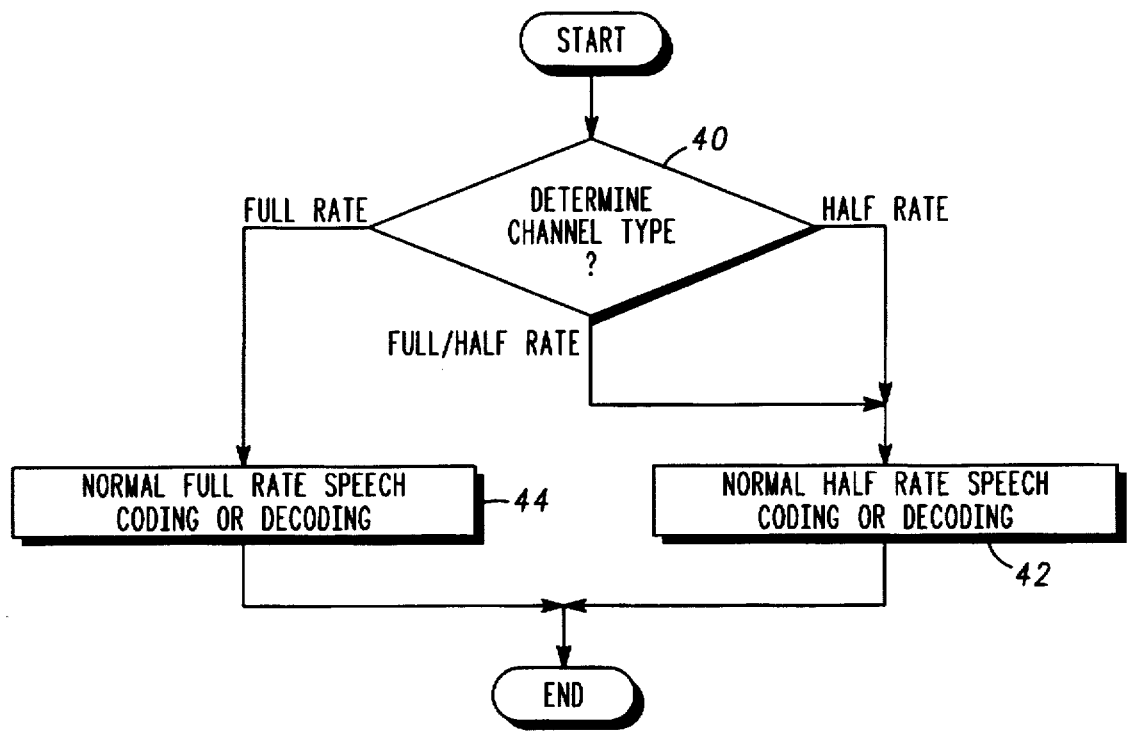
FIG. 4 shows a flow chart for a speech codec according to the present invention.

Referring to FIG. 2 a communications system may provide a combination full/half rate service type including a half rate speech codec 30 and a full rate channel codec 32 having a front end arranged for communication with the half rate speech codec 30 wherein the front end includes a bit mapping re-ordering module 33.

Particularly, an implementation of such a combination service type may be described in reference to FIG. 3. FIG. 3 shows a block diagram of an uplink communication utilising the full/half rate service of the present invention.

Speech is delivered to an input 10 of an audio interface 12 of a mobile station 11. The audio interface transmits the speech to a first half rate speech codec 30 for providing coded signals.

The coded signals are delivered to a parameter to sensitivity bit re-ordering module 33 of a first hybrid channel processor 32 that re-orders the bits of the coded signals as further described below. The re-ordered bits are then delivered to a full rate channel codec 20 for further processing. The output of the full rate channel codec 20 is transmitted over the air via RF interfaces 22 to a second hybrid channel processor 31 located at a base transceiver station 13.

A full rate channel codec 21 of the second hybrid channel processor 31 decodes the transmitted signals 34 and delivers them to a sensitivity to parameter bit re-ordering module 35 of a the second hybrid channel processor 31 for re-ordering the bits of the decoded signals. The re-ordered bits are then transmitted to a second half rate speech codec 37 via a serial link 39 for further decoding and outputting 64 kbit/s speech at its output 26. The serial link 39 is needed if the second half rate speech codec 37 is remotely located from the hybrid channel processor 31. In other words, the second half rate speech codec 37 does not need to be remotely located from the hybrid channel processor 31.

FIG. 4 shows a flow chart for an operation of the speech codec 30, 37 according to the present invention. Since speech codecs are to be able to operate in full rate, half rate service or full/half rate service according to the present invention it is necessary to indicate the desired mode and operation of the speech codec. For example, in FIG. 4 the speech codec determines what mode of operation is desired as in step 40 and if it is full rate then normal full rate speech coding or decoding operation is implemented as in step 44. If either half rate or full/half rate is desired the normal half rate speech coding or decoding operation is implemented as in step 42.

Figure 5:
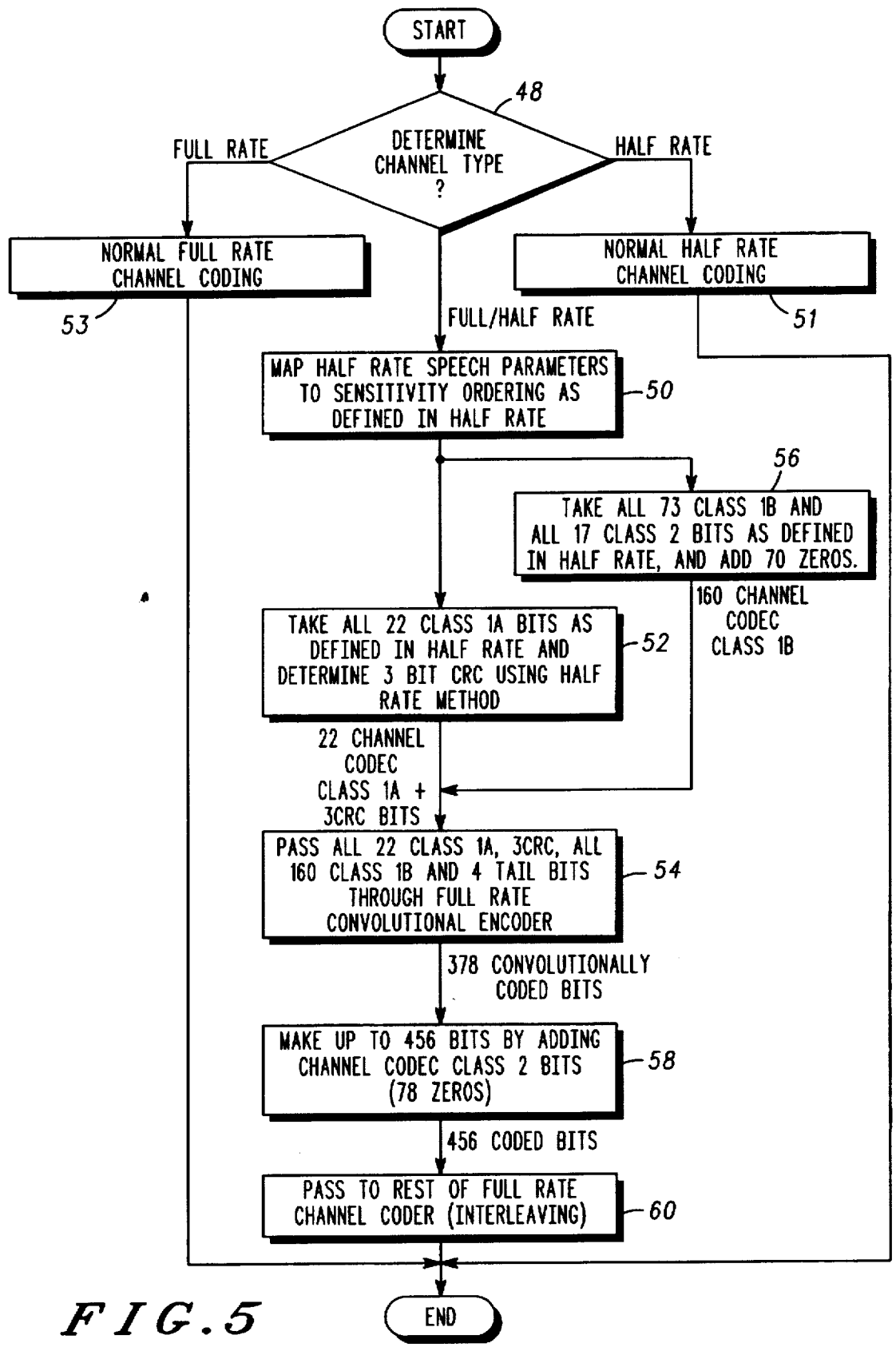
FIG. 5 shows a flow chart for a channel coder according to the present invention.

However, for a channel coder operation of the hybrid channel processor 32 a bit re-ordering module 33 is supplied and according to a preferred embodiment of the present invention operates as described in FIG. 5. The hybrid channel processor or codec 32 determines what channel service type is desired as in step 48. If it is full rate then normal full rate channel coding is implemented as in step 53. Similarly, if it is half rate then normal half rate channel coding operation is implemented as in step 51.

However, if full/half rate channel service is indicated than the bit re-ordering module 33 of the hybrid channel processor 32 maps half rate speech parameters to sensitivity ordering as defined in the standard half rate algorithm as in step 50. The bit re-ordering module 33 then takes all 22 class 1a bits as defined in half rate and determines 3 bit CRC using the standard half rate method as in step 52 resulting in 22 channel codec class 1a and 3 CRC bits. Simultaneously, in step 56, the bit re-ordering module 33 then takes all 73 class 1b bits and 17 class 2 bits as defined in half rate and adds 70 zeroes resulting in 160 channel codec class 1b bits.

The resulting in 22 channel codec class 1a and 3 CRC bits and 160 channel codec class 1b bits are all processed respectively, in step 54, as 22 class 1a, 3 CRC, 160 class 1b and 4 tail bits through a full rate convolutional encoder resulting in 378 convolutionally coded bits. The convolutionally coded bits are added with channel codec class 2 bits (78 zeroes) to make up 456 bits as in step 58. The 456 coded bits are passed to the rest of the full rate channel coder including interleaving as in step 60.

Figure 6:
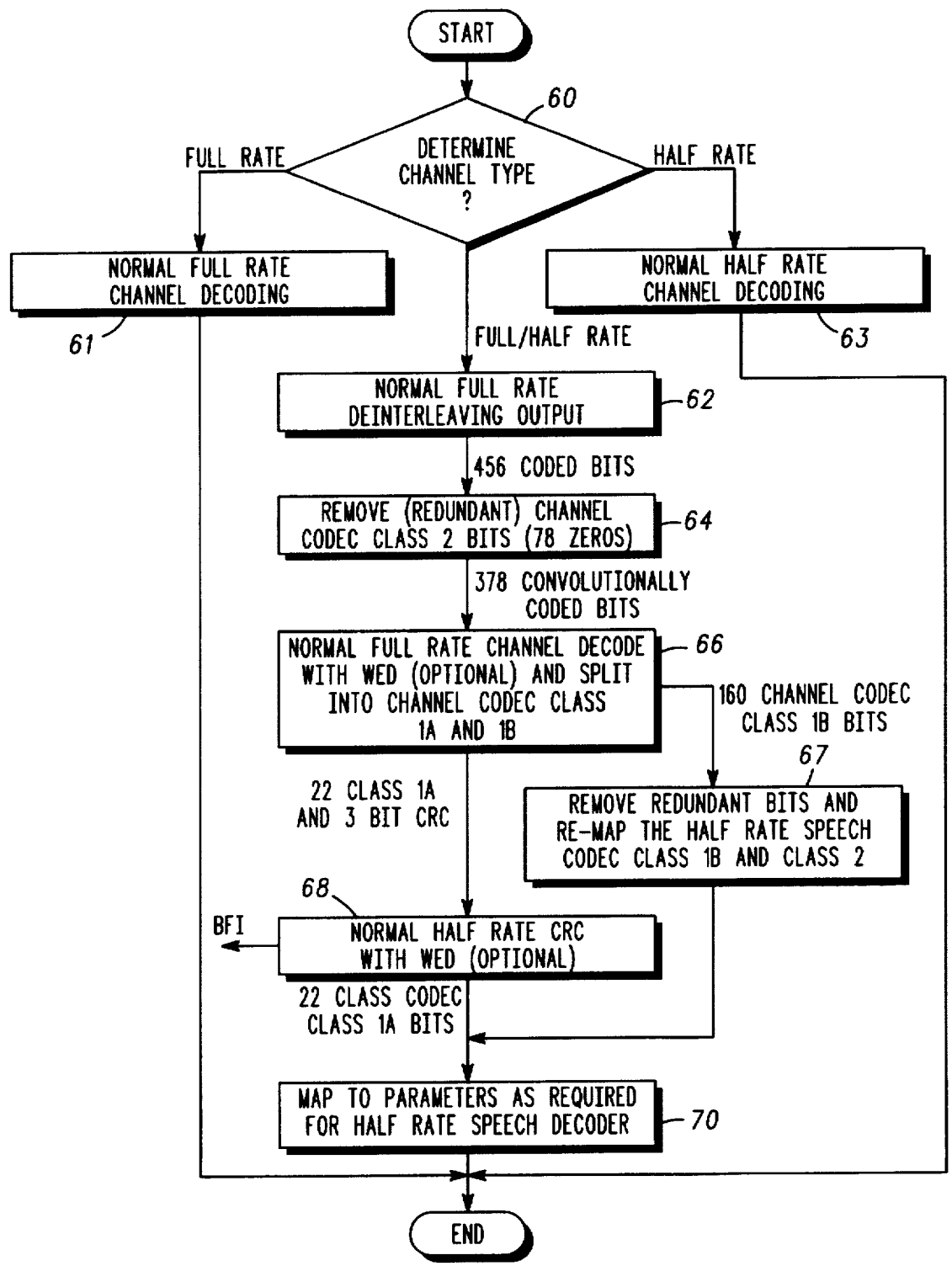
FIG. 6 shows a flow chart for a channel decoder according to the present invention.

A channel decoder operation of the hybrid channel processor 31 requires the reverse operation of the bit re-ordering module 35 according to a preferred embodiment of the present invention as described in FIG. 6. The hybrid channel processor or codec 31 determines what channel service type is desired as in step 60. If it is full rate then normal full rate channel decoding is implemented as in step 61. Similarly, if it is half rate then normal half rate channel decoding operation is implemented as in step 63.

However, if full/half rate is indicated then normal full rate de-interleaving output is processed as in step 62 resulting in 456 coded bits. The 456 coded bits are processed as in step 64 to remove the redundant channel codec class 2 bits (78 zeroes) resulting in 378 convolutionally coded bits. The 378 convolutionally coded bits are processed as in step 66 by the normal (standard) full rate channel decode including the WED optionally and split into channel codec class 1a and 1b bits.

The resulting 22 class 11a and 3 bit CRC bits are processed as in step 68 by the standard half rate CRC check method with WED optionally resulting in a BFI. The expected resulting 22 speech coded class 1a bits are mapped to parameters as required for a standard half rate speech decoder as in step 70.

The other resulting 160 channel codec class 1b bits are also mapped to parameters as required for a standard half rate speech decoder as in step 70.

The new service type can be indicated by adding a dimension to the flag which is sent to the channel codec indicating which service type is being utilised: full rate, half rate or full/half rate.

The FIGS. may be easily extrapolated to a down link communication.

In summary, the bit re-ordering module may use a table to map bits. Firstly, the table it uses to map the bits, delivered from the speech coder, from parametric order to subjective sensitivity order is the half rate table instead of the full rate table. Secondly, after mapping these bits, they are mapped again to the 3 classes for the full rate channel codec. It is suggested that the number of channel codec class 1a bit be 22, channel codec class 1b bits be 160 and channel codec class 2 bits be 78. This is done by re-mapping:

- all 22 speech codec class 1a bit to all 22 channel codec class 1a bits;
- all 73 speech codec class 1b and all 17 speech codec class 2 bits to 90 of the 160 channel codec class 1b bits;
- setting the remaining 160−90=70 channel codec class 1b bits to some known value, such as 0; and
- setting all 78 channel codec class 2 bits to some known value, such as 0.

Hence, all speech bits will have protection added by the channel coder as they are all mapped to either class 1a or class 1b.

A reason for reducing the number of class 1a bits is as follows. The CRC should only operate over those bits whose meaning is so important that an error in any 1 could mean the inability to intelligibly regenerate the original speech. Having more bits in this class (1a) without the extra bits fulfilling the CRC purpose criteria could lead to a frame being discarded unnecessarily. Hence there is a need or a restriction to only include bits into class 1a if they are really necessary. The off-shoot of this is the need to have more (or the availability of more) class 1b bits in order to have enough bits for passing to a normal full rate convolutional coder. In the normal full rate scheme the number of bits passed to the convolutional coder is 189 (50 1a, 3 CRC 132 1b and 4 tail). According to the present invention, the number of class 1a is 22, CRC 3 and tail 4 so the number of class 1b left is 160 (189-22-34).

A third change for the channel codec could be to include the WED to the channel decoding as specified for the half rate channel codec and as described with reference to FIG. 6.

The combination full/half rate system and method of the present invention provides a more robust half rate service while being able to reap the benefits of 8 kbits sub-rate multiplexing between a remote speech codec and a channel codec. The present invention provides a service like full rate but with the lower cost benefits of 8 k sub-rate multiplexing between a remote speech codec and a channel codec.

The advantages of the present invention over full rate service is as follows. The present invention provides full rate type of service at a half rate leasing cost of the serial links between remote speech codec and base site, as the speech coder to channel coder is at half rate (i.e., 8 kbits instead of 16 kbits). Plus a more robust/better perceptual speech quality as the full rate channel coder could be made to use the half rate WED to improve channel decoding.

The advantages of the present invention over half rate service are as follows. The present invention provides a more robust/better perceptual speech quality as all half rate speech bits are protected and although the interleaving is the same, more than half of the channel bits are known.

The present invention introduces a full/half rate speech service type in addition to the existing full rate and half rate speech service types. In the full/half rate service type, a Motorola half rate speech codec is used in preference to the full rate speech codec during such a call. Thus a half rate speech codec is mixed with a modified full rate channel codec. The channel codec used during such a call would be the full rate channel codec with a different front end. Thus, a more robust half rate service is presented resulting in costs saving for the speech codec to channel codec link.

We claim:

1. A communications system for providing a combination full/half rate service type, the communications system comprising:

half rate speech codec; and full rate channel codec having a front end arranged for communication with
      the half rate speech codec wherein the front end comprises:
      a mapper for mapping half rate speech parameters to half rate sensitivity ordering;
      a CRC (cyclic redundancy code) processor for processing a first portion of the mapped speech parameters and determining a CRC using a half rate method; and
      a convolutional encoder for full rate encoding at least the first portion and a second portion of the mapped speech parameters, thereby forming an encoded set of bits.

2. The communications system of claim 1 wherein the full rate channel codec is located at a base transceiver station and the half rate speech codec is remotely located from the base transceiver station via a serial link.

3. The communications system of claim 1 wherein the mapper comprises parameter to sensitivity or a sensitivity to parameter bit re-ordering.

4. A mobile station arranged for communication in a communications system, the mobile station comprising:

half rate speech codec; and full rate channel codec having a front end arranged for communication with the half rate speech codec wherein the front end comprises:
      a mapper for mapping half rate speech parameters to half rate sensitivity ordering;
      a CRC (cyclic redundancy code) processor for processing a first portion of the mapped speech parameters and determining a CRC using a half rate method; and
      a convolutional encoder for full rate encoding at least the first portion and a second portion of the mapped speech parameters, thereby forming an encoded set of bits.

5. The mobile station of claim 4 wherein the mapper comprises parameter to sensitivity or a sensitivity to parameter bit reordering.

6. A method for providing a combination full/half rate service in a communications system having a half rate speech codec, a full rate channel codec, the method comprising the steps of:

generating, via the half rate speech codec, half rate speech parameters;

mapping the half rate speech parameters to half rate sensitivity ordering;

CRC (cyclic redundancy code) processing a first portion of the mapped speech parameters thereby determining a CRC using a half rate method;

full rate convolutionally encoding at least the first portion and a second portion of the mapped speech parameters, thereby forming an encoded set of bits; and passing at least the encoded set of bits to the full rate channel codec.

7. A method for providing a combination full/half rate service in a communications system having a half rate speech codec, and a full rate channel codec, the method comprising the steps of:

full rate channel decoding a full rate deinterleaved output received from the full rate channel codec to thereby form a decoded set of bits;

CRC (cyclic redundancy code) processing at least a first portion of the decoded set of bits and determining CRC bits using a half rate method;

mapping at least the decoded and CRC processed set of bits into half rate speech parameters; and passing at least the half rate speech parameters to the half rate speech codec.

8. A method for providing a combination full/half rate service in a communications system having a first and second half rate speech codec and a first and second hybrid full rate channel codec processor, the method comprising the steps of:

transmitting speech to the first half rate speech codec for providing coded signals;

transmitting the coded signals of the half rate speech codec to the first hybrid full rate channel codec processor;

re-ordering the bits of the coded signals in the first hybrid full rate channel codec processor;

transmitting the re-ordered bits to a full rate channel codec of the first hybrid full rate channel coded processor for providing further coded signals;

transmitting the further coded signals to a full rate channel codec of the second hybrid full rate channel coded processor for providing decoded signals;

re-ordering the bits of the decoded signals in the second hybrid full rate channel codec processor; and transmitting the re-ordered bits to the second half rate speech codec for further decoding.

* * * * *